United States Patent Office 3,431,549
Patented Mar. 4, 1969

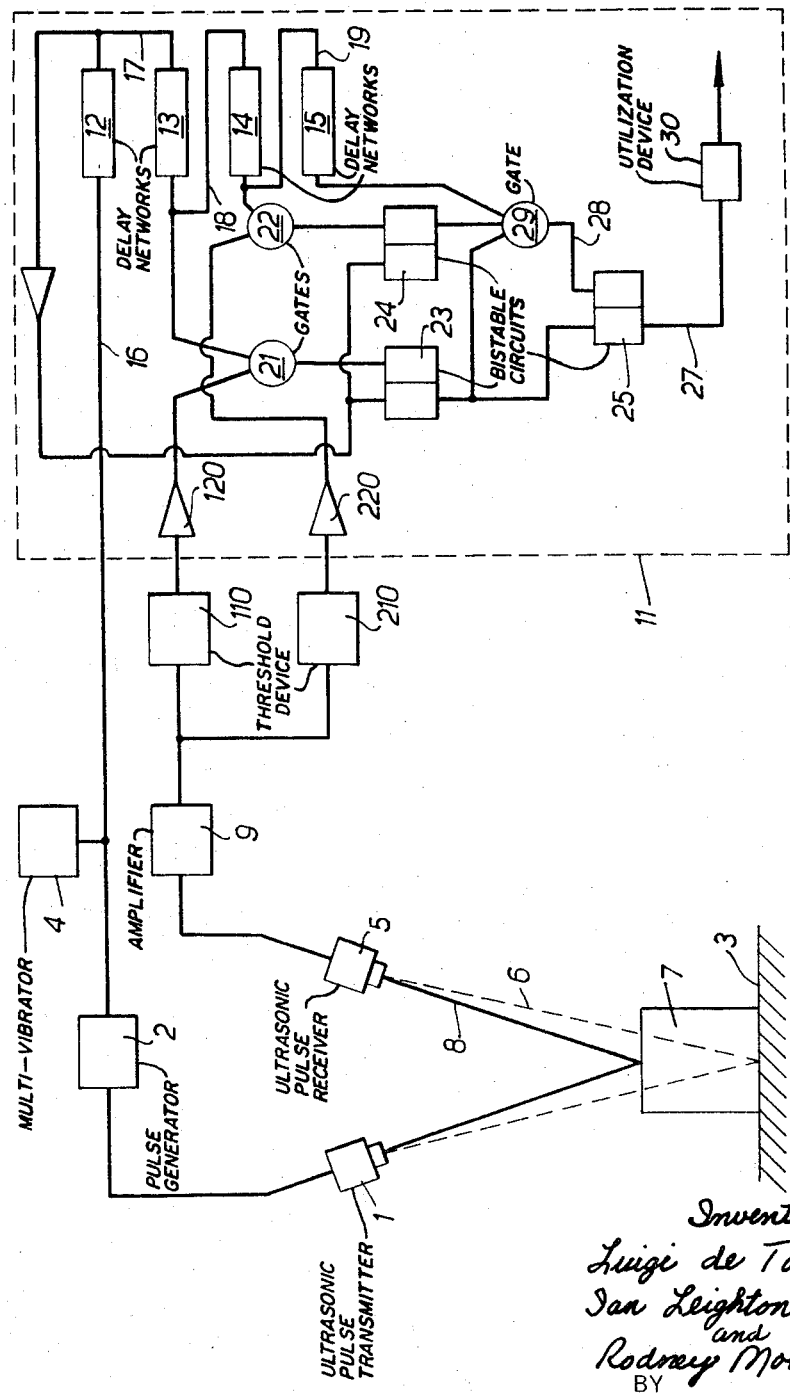

3,431,549
ULTRASONIC PRESENCE DETECTORS
Luigi de Tullio, Ian Leighton Spence, and Rodney Mostyn, Essex, England, assignors to The Marconi Company, Limited, London, England, a British company
Filed June 21, 1967, Ser. No. 647,828
Claims priority, application Great Britain, June 21, 1966, 27,712/66
U.S. Cl. 340—1                8 Claims
Int. Cl. G01s 9/66

ABSTRACT OF THE DISCLOSURE

Known vehicle detectors indicate that a vehicle is present by observing pulses received during a predetermined time interval during which pulses reflected from the top of a vehicle may be expected to be received. With such vehicle detectors for commercial vehicles, carrying absorbent loads, the cessation of pulses falsely indicates the vehicle leaving the zone of observation when it has not. In the invention vehicles set up a responded condition which is only terminated upon receipt of road echo. The vehicle echoes and road echoes may be submitted to different levels of threshold limiting to take into account the alternation of road echo in snow.

---

Figure 1:
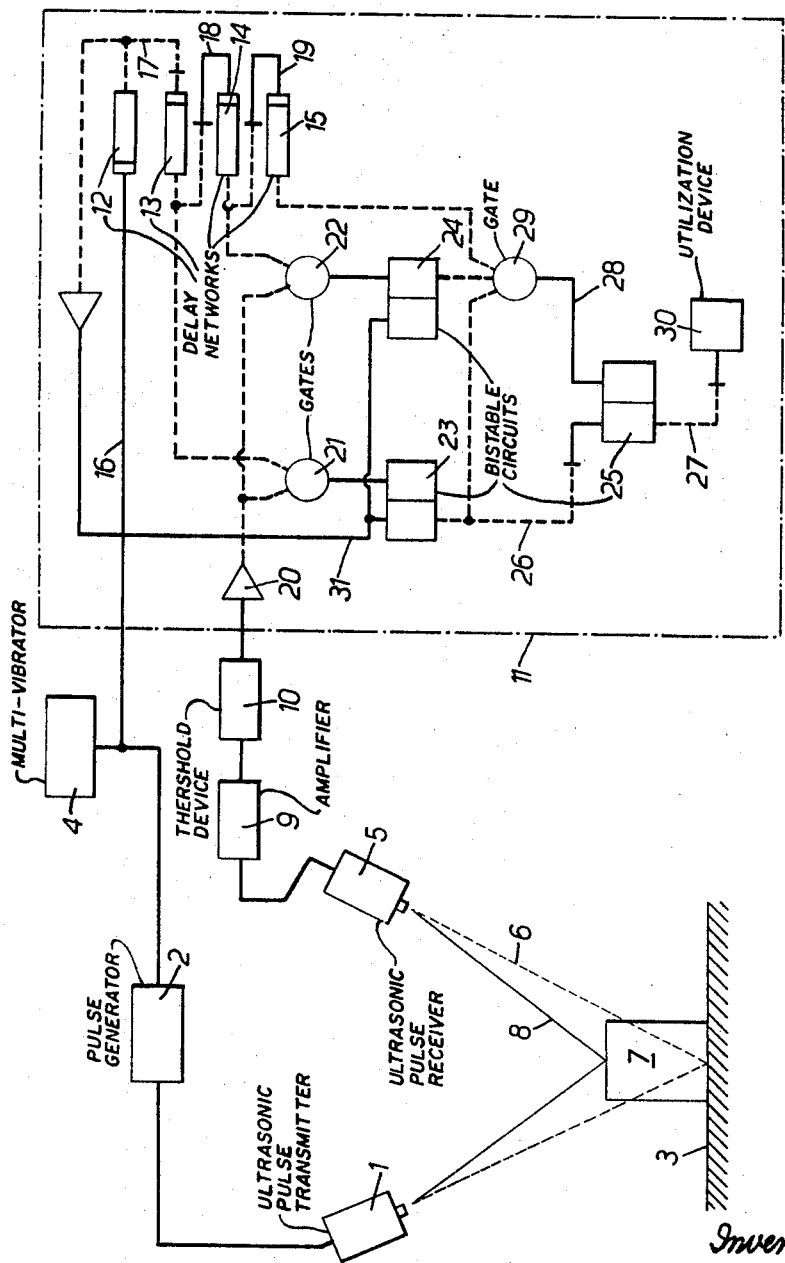

This invention relates to ultrasonic presence detectors and more particularly, but not exclusively, to ultrasonic vehicle detectors for use in road traffic control.

Ultrasonic presence detectors of the kind with which the present invention is concerned rely upon the difference between the transit time of a pulse of ultrasonic energy transmitted by a transmitting transducer towards and reflected from a reference surface and the transit time of a pulse of ultrasonic energy similarly transmitted if a body is present between the transducer and the reference surface. If a body is present, pulses will be reflected from the surface of the body and the total path length, and hence the transit time, will be materially shortened.

In ultrasonic traffic detectors as at present known indication that a vehicle is present is obtained by observing pulses received during a pre-determined time interval, ending before the normal time of arrival of a pulse reflected from the road surface (the reference surface), during which pulses reflected from the top of a vehicle may be expected to be received. Such traffic detectors suffer from the serious defect that indication that an observed vehicle has left the zone of observation is taken to be the cessation of reflected pulses during the aforementioned pre-determined time interval. Thus, for example, where the vehicle being observed is a commercial vehicle carrying a load which is of an absorbent nature, such as hay, or a load of a dispersive nature, such as gravel, the cessation of received reflected pulses would indicate that the vehicle had left the zone of observation when, in fact, it had not. A similar problem exists in certain industrial presence detectors when, for example, the passage of articles of a partly absorbent construction is to be monitored.

It is one object of the present invention to provide improved presence detectors which do not suffer from the above defect.

According to this invention an ultrasonic presence detector of the kind referred to comprises means for producing a pre-determined responded condition when a body is interposed between the transmitting transducer and the reference surface and means actuated only upon receipt of a reflected echo for changing the responded condition.

Preferably the detector includes means for branching received reflected pulses into two paths one of which includes a normally open gate which is closed at the times in which pulses reflected from the reference surface would be received, and the second of which includes a normally closed gate which is open at said times, means actuated by pulses passed by the normally open gate to set up a responded condition indicative of the presence of an interposed body, and means actuated by pulses passed by said normally closed gate for terminating the responded condition. In order to reduce the chances of faulty operation by spurious responses from cyclists, pedestrians and the like, a threshold responsive device, such as a Schmitt trigger circuit may be interposed in the receiver channel prior to the branching thereof into the two paths.

Preferably, pulses passed by said normally open gate are applied to a first bistable circuit adapted to be set to one of its stable states upon receipt of pulses from said gate and pulses passed by said normally closed gate are applied to a second bistable circuit to set that circuit to one of its stable states, said first bistable circuit being connected to a third bistable circuit adapted to change to one of its stable states as said first bistable circuit is set, means for taking output from said third bistable circuit, and means for resetting said third bistable circuit, so as to change the polarity of its output only when said second bistable circuit is set to said one of its states.

Preferably the means for resetting said third bistable circuit includes a third gate adapted to pass a resetting signal from said second bistable circuit to said third bistable circuit only when said first bistable circuit is not set to said one of its two stable states and said second bistable circuit is set to said one of its two stable states.

Preferably also said third gate is inhibited from opening except for short periods following times when reflected echoes from said reference surface could be received.

Preferably again said first and said second bistable circuits are reset as and when a further pulse of ultrasonic energy is transmitted towards said reference surface.

Preferably also said normally open gate is inhibited from opening during a short period following the transmission of a pulse of ultrasonic energy towards said reference surface said duration being sufficient to prevent pulses received as a result of direct transmission between transmitting and receiving transducers from passing therethrough.

Preferably said normally open gate, said normally closed gate and said third gate are controlled as to their periods of opening by a cascaded series of timing networks the first of which is triggered in synchronism with the transmission of a pulse of ultrasonic energy from the transmitting transducer.

Preferably again the second of the timing networks in the cascaded series of timing networks controls the said normally open gate, the first of the networks triggering the second, to open said normally open gate, after a predetermined period following the transmission of a pulse of ultrasonic energy from said transmitting transducer sufficient to prevent pulses received as a result of direct transmission between the transmitting and receiving transducers from passing said normally open gate.

Preferably again pulses for transmission from said transmitting transducer are derived from a pulse generator which is triggered by the leading edge of the output waveform of a multi-vibrator, said leading edge being also arranged to trigger said cascaded series of timing circuits.

Means may be provided for utilising the time arrival of signals passed by the normally open gate to provide an indication of the distance separating the reflecting surface of the body from the reference surface. Means may also be provided for utilising the duration of the output from the third bistable circuit to provide an indication either of the dimension of a body in the direction of travel or, if this dimension is known, the speed of said body.

In embodiments in which received reflected pulses are branched into two paths, one of which includes a normally open gate which is closed at the times in which pulses reflected from the reference surface would be received, and the second of which includes a normally closed gate which is open at said times, in which means actuated by pulses passed by said normally open gate are arranged to set up a responded condition indicative of the presence of an interposed body, and wherein said responded condition is terminated by pulses passed by said normally closed gate it is possible, if a threshold responsive device is interposed in the receiver channel prior to the branching thereof into two paths, for unsatisfactory operation to occur in certain conditions. Thus, for example, if there is snow on the ground, unsatisfactory operation can occur because, owing to the presence of the snow an echo reflected from the reference surface may be insufficiently strong to exceed the threshold level of the threshold responsive device and, if this happens, the said reflected echo will not terminate the responded condition. Deep snow is only one of the possible conditions which can produce unsatisfactory operation because of an unduly weak reflected error from the reference surface.

To avoid the defect just described the ultrasonic presence detector may include in the normally open gate containing path a threshold responsive device adapted to respond to or pass only signals exceeding a pre-determined minimum amplitude. Also a second threshold responsive device may be provided in the second path containing the normally closed gate. This second device may be adapted to respond to or pass only signals exceeding a second, substantially lower, pre-determined minimum amplitude.

In practice, in all embodiments one may vary the pulse repetition period of transmitted ultrasonic pulses e.g. in the case of a vehicle detector in order to adjust operation to suit different installed heights of the transmitter and/or receiver above a road surface. Where reflected pulses are fed to one or more threshold responsive devices before utilisation, alteration in the propagation distance a pulse has to travel from the transmitter to the reference surface and back to the receiver (e.g. alteration in installation height) will obviously alter the received pulse strength in otherwise unchanged conditions. A threshold responsive device adjusted to have a threshold response value which is right in the case of a certain propagation distance will therefore be wrong if the distance is altered. One may provide convenient adjustment means for dealing with this problem and this may be done by including, in an ultrasonic presence dector employing one or more threshold devices, means for adjusting the transmitted pulse repetition period and means for adjusting the effective threshold response value or values. Preferably these two adjustment means are gang-controlled though it is possible to use independent controls and to associate therewith scales whereby they may be correctly adjusted to suit one another. The effective threshold response value or values may be adjusted by adjusting the actual threshold value or values of the threshold responsive device or devices but it is usually simpler to accomplish this by adjusting the gain or gains of an amplifier or amplifiers through which said device or devices is or are fed.

Where the timing of the presence detector relies upon a multivibrator, a set of different multivibrator time constant determining components may be provided which are selectable in turn by means of a uniselector switch. Adjustment of the gain of the amplifier (when this expedient is adopted) may be achieved by providing thereacross a feedback loop into which one or other of a set of limiting resistors may be switched by means of a uniselector switch. The uniselector switch controlling the time constant of the multivibrator and the uniselector switch controlling the gain of the amplifier may be ganged together and controlled by the same unit situated at any point convenient to the operator.

Figure 2:
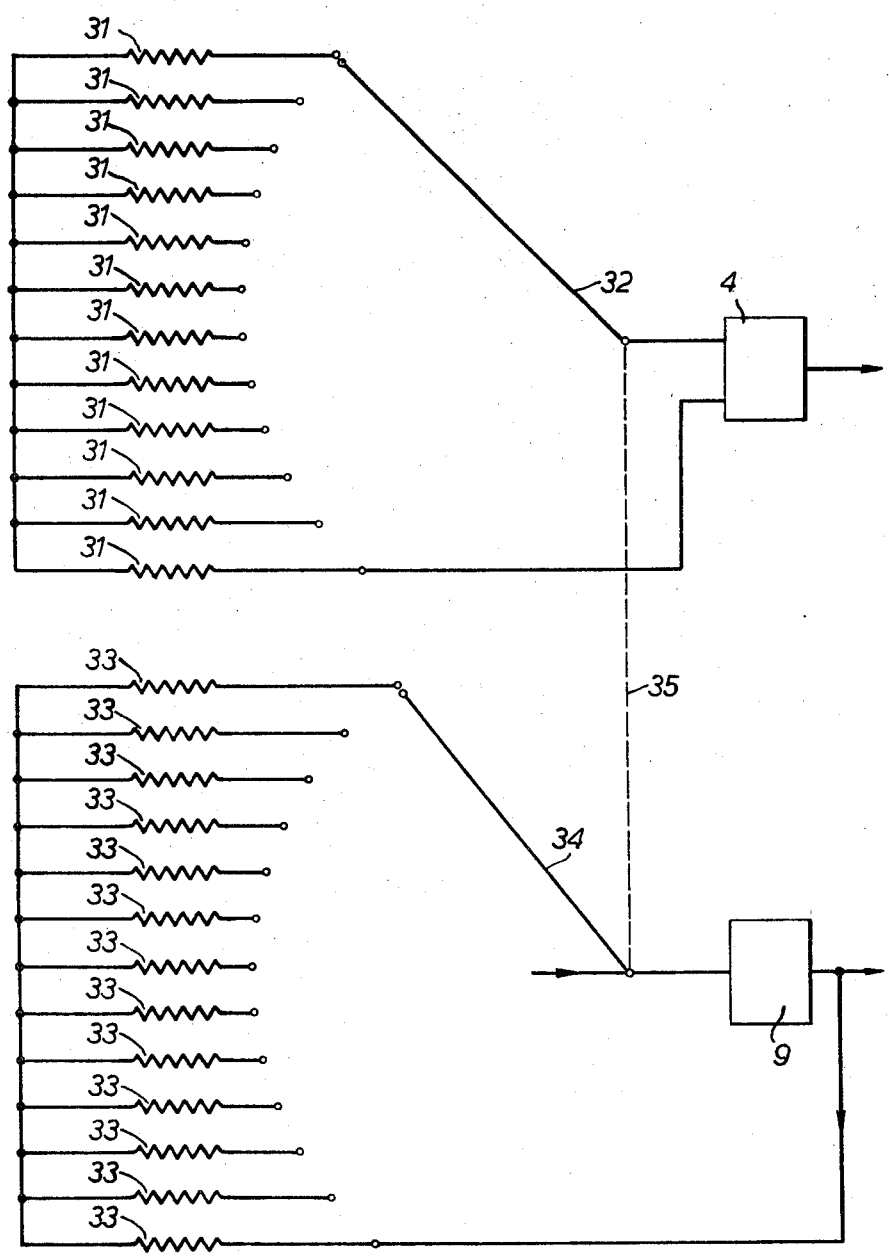

The invention and the foregoing features are illustrated in the accompanying drawings. FIGURE 1 and FIGURE 1a show two alternate arrangements and FIGURE 2 illustrates a modification which is particularly described in what follows as made to the arrangement shown in FIGURE 1a but which may be also obviously applied to the embodiment illustrated by FIGURE 1.

Referring to FIGURE 1, an ultrasonic pulse transmitter 1 directs pulses of ultrasonic energy, derived from a pulse generator 2, towards the road surface 3 above which the transmitter 1 is placed. The pulses generated by pulse generator 2 have a duration of approximately 2 milliseconds and a repetition rate controlled by a free-running multivibrator 4. An ultrasonic pulse receiver 5 is provided to receive pulses from the transmitter 1 either after reflection from the road surface 3, over the path 6 shown in dashed line, or after reflection from the top of a vehicle 7, over the path 8 shown in full line. Pulses received by the receiver 5 are amplified in an amplifier 9 and applied to a Schmitt trigger threshold circuit 10 having an adjustable setting. The threshold circuit 10 is set to pass signals of greater than a pre-determined amplitude in order to discriminate against noise and spurious reflection obtained for example from cyclists or pedestrians. Signals of an amplitude exceeding the threshold setting of the threshold circuit 10 are passed to the processing circuit shown within the chain line 11.

The processing circuit 11 includes a chain of timing circuits 12, 13, 14 and 15. Timing circuit 12 is triggered over lead 16 by the same edge of the output waveform from multivibrator 4 as triggers the pulse generator 2. Timing circuit 12 triggers timing circuit 13 over lead 17 after a pre-determined time delay. Timing circuit 13 in turn triggers timing circuit 14 over lead 18 after a further pre-determined time delay and timing circuit 14 in turn triggers timing circuit 15 over lead 19 after a further pre-determined time delay.

Signals passed by the threshold circuit 10 are amplified in an amplifier 20 and applied to two gates 21 and 22. Gate 21 is opened by timing circuit 13 after a pre-determined delay, provided by timing circuit 12, following the triggering of the pulse generator 2 which delay is made sufficient to prevent signals picked up by direct transmission from the transmitting to receiving transducers, or due to electrical break-through, from passing through the gate 21. When gate 21 is open any signals present pass through it to set a bistable device 23 to one of its stable states. Gate 21, under the control of timing circuit 13, is closed shortly before the expected time of arrival of an echo reflected from the ground. As gate 21 is closed gate 22 opens under control of timing circuit 14 and remains open until after the expected time of arrival of an echo reflected from the ground. Any signal received during the time gate 22 is opened passes through it to set a further bistable circuit 24 to one of its stable states. Thus bistable circuit 23 is set on the reception of the first echo from a vehicle whilst bistable circuit 24 is set upon receipt of an echo from the ground. Both bistable circuit 23 and bistable circuit 24, whenever set, remain set until they are reset over lead 31 at the instant pulse generator 2 is triggered to commence a new transmission cycle.

As bistable circuit 23 is set, i.e. when an echo from a vehicle is received, so a further bistable circuit 25 is set to one of its stable states over lead 26. The setting of bistable circuit 25 causes the polarity of its output line 27 to change thus indicating the presence of a vehicle. Once set, bistable circuit 25 remains set until it is reset by a signal arriving over lead 28 from a further gate 29. Gate 29 is inhibited from opening except for a very short period following the time when the receipt of an echo from the ground may be expected, determined by timing circuit 15. Even during this period however gate 29 will only open if bistable circuit 24 is set and bistable 23 is not set. Thus if bistable circuit 25 is set due to the reception of an echo from a vehicle it will only reset to change the polarity of the output line 27 if a ground echo signal has been received to set bistable circuit 24. Hence once indication is provided that a vehicle is present indication of the presence of a vehicle will continue until the reception of a ground echo positively indicates that the vehicle has passed on. The signal on output line 27, having a polarity depending upon the presence or otherwise of a vehicle, may be passed to any desired utilisation means 30 such as a counter.

Although not shown, means may also be provided for utilising the time of arrival of signals passed by gate 21 to provide an indication of height of the vehicle. Means (again not shown) may also be provided for utilising the duration of the output, of a polarity indicative of the presence of a vehicle, from bistable circuit 25 to provide an indication either of the length of the vehicle or, if the length is known, its speed.

Referring now to FIGURE 1a this shows an ultrasonic traffic detector which is generally similar to that shown in the above described FIGURE 1 except for the arrangement provided for applying signals from the amplifier 9 to the normally open gate 21 and the normally closed gate 22. In the embodiment shown in the present FIGURE 1a signals from amplifier 9 are branched directly into two paths. The first path, leading to normally open gate 21, contains a Schmitt trigger threshold circuit 110 and an amplifier 120 and the second path, leading to normally closed gate 22, contains a Schmitt trigger threshold circuit 210 and an amplifier 220. Threshold circuit 110, in the path leading to normally open gate 21, is adjustable to a level such as to prevent the passage of spurious reflected signals from cyclists, pedestrians and the like. Threshold circuit 210, in the path leading to the normally closed gate 22, is adjustable to such level as to pass pulses reflected from the road surface. Thus, the threshold circuit 110 may be adjusted to prevent spurious reflected signals from being applied to the normally open gate 21 whilst threshold circuit 210 may be adjusted to pass reflected echoes from the road surface to the normally closed gate 22 even though the pulses reflected from the road surface may be of low amplitude due to attenuation caused by a layer of snow on the road surface, whilst still preventing the passage of lower level noise signals.

The modification illlustrated in FIGURE 2 consists in providing the multivibrator 4 with a set of different multivibrator time constant determining resistors 31 each selectable in turn by means of a uniselector switch the rotor of which is shown at 32. Thus the frequency of operation of the multivibrator 4 may be adjusted in discrete steps in order to permit the traffic detector to be operated with different distances separating the transmitting and receiving transducers from the ground surface. Also a feedback loop is provided across the amplifier 9. A set of different limiting resistors 33 are provided to be switched in turn into the feedback loop across amplifier 9 by means of a further uniselector switch the rotor of which is shown at 34. Thus the overall gain of the amplifier 9 may be adjusted suitably to adjust the effective threshold response values of the threshold circuits 110 and 210 (or threshold value of the threshold circuit 10 of the embodiment described with reference to FIGURE 1) in order to compensate for changes in the amplitudes of received echo signals resulting from the detector being operated with different distances separating the transmitting and receiving transducers from the road surface. The rotors 32 and 34 are conveniently ganged to move together, as represented by the dashed line 35, and are controlled by the same control unit (not shown) which may be situated at any point convenient to the operator.

We claim:
1. An ultrasonic presence detector for detecting the presence of a body between the detector and a reference surface comprising a transmitting transducer, a receiving transducer, receiver channel means for branching pulses fom said receiving transducer and corresponding to received reflected pulses into two paths, a first gate closed only at times in which pulses reflected from the reference surface would be received included in one of said two paths, a second gate open only at said times included in the second of said two paths, first bistable circuit means electrically connected to said first gate for assuming one of its stable states in response to pulses passed by said first gate, said pulses being indicative of a body being interposed between the transmitting transducer and the reference surface, second bistable circuit means electrically connected to said second gate for assuming one of its stable states in response to pulses passed by said second gate, and third bistable circuit means, said first bistable circuit means being connected to said third bistable circuit means for changing said third bistable circuit means to one of its stable states in response to said first bistable circuit means assuming one of its stable states to provide one output condition of said third bistable circuit means, and means for resetting said third bistable circuit means in response to said second bistable circuit means assuming said one of its states to alter the output of said third bistable circuit means.

2. A detector as claimed in claim 1 wherein the means for resetting the third bistable circuit includes a third gate for passing a resetting signal from said second bistable circuit to said third bistable circuit only when said first bistable circuit is not set to said one of its two states and said second bistable circuit is set to said one of its two stable states.

3. A detector as claimed in claim 2 including means for limiting the opening of said third gate to short periods following times when reflected echoes from said reference surface could be received.

4. A detector as claimed in claim 3 including means for resetting said first and said second bistable circuit means when a further pulse of ultrasonic energy is transmitted towards said reference surface from said transmitting transducer.

5. A detector as claimed in claim 4 including means for inhibiting the opening of said first gate during a short period following the transmission of a pulse of ultrasonic energy toward said reference surface by said transmitting device, the duration of said period being sufficient to prevent pulses received as a result of direct transmission between said transmitting and receiving transducers from passing through said first gate.

6. A detector as claimed in claim 5 including a cascaded series of timing networks for controlling the periods of opening of said first gate, said second gate and said third gate, the first of said timing networks in said cascaded series being triggered in synchronism with the transmission of a pulse of ultrasonic energy from said transmitting transducer.

7. A detector as claimed in claim 6 wherein the second of the timing networks in the cascaded series of timing networks controls the said first gate, the first of the networks triggering the second of said networks to open said first gate, after a predetermined period following the transmission of a pulse of ultrasonic energy from said transmitting transducer sufficient to prevent pulses received as a result of direct transmission being the transmitting and receiving transducers from passing said first gate.

8. A detector as claimed in claim 7 including a pulse generator and a multivibrator, pulses for transmission being derived from said pulse generator which is electrically connected to and triggered by the leading edge of the output waveform of said multivibrator, said multivibrator also being electrically connected to said timing networks to trigger said cascaded series of timing networks by said leading edge.

References Cited

UNITED STATES PATENTS

| | | | |
|---|---|---|---|
| 3,110,008 | 11/1963 | Kendall et al. | 340—1 X |
| 3,199,074 | 8/1965 | Hales et al. | 340—1 X |
| 3,214,729 | 10/1965 | Frielinghaus | 340—1 X |
| 3,290,490 | 12/1966 | Auer | 235—150.24 |
| 3,329,932 | 7/1967 | Auer et al. | 340—38 |

RICHARD A. FARLEY, *Primary Examiner.*

U.S. Cl. X.R.

340—38